W. J. ROECKER.
MOTOR SLEIGH.
APPLICATION FILED AUG. 16, 1917.
1,299,862.
Patented Apr. 8, 1919.
4 SHEETS—SHEET 2.
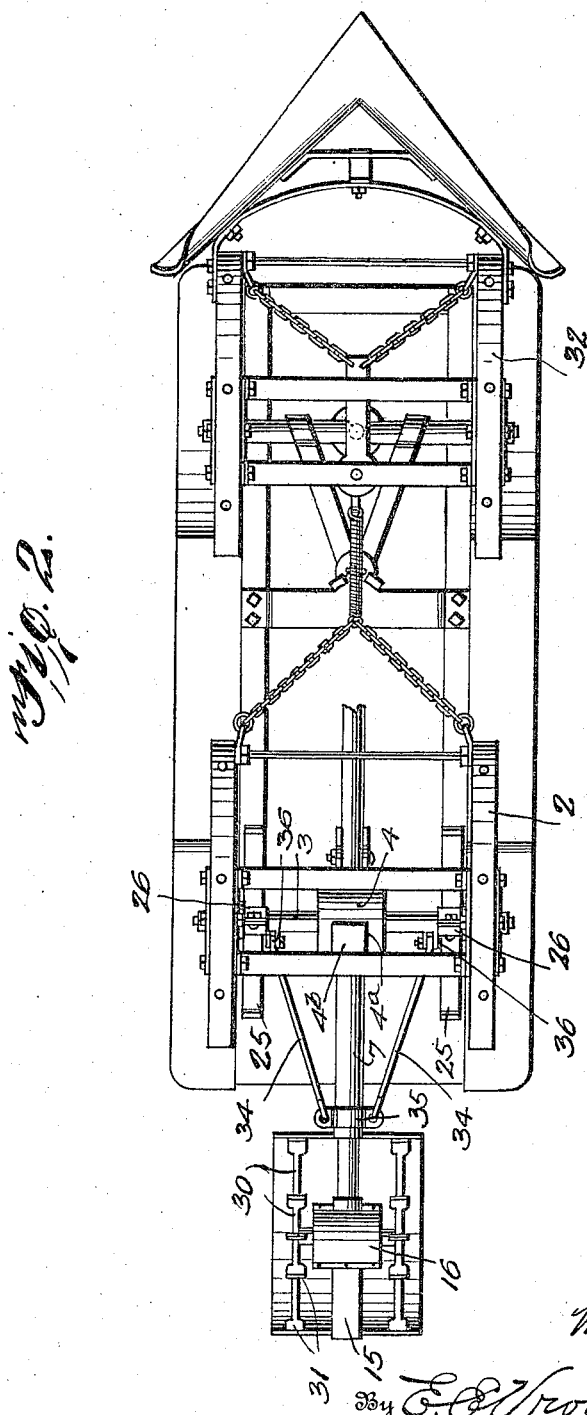
Inventor
W. J. Roecker
By E. E. Vrooman & Co,
his Attorneys W. J. ROECKER.
MOTOR SLEIGH.
APPLICATION FILED AUG. 16, 1917.
1,299,862.
Patented Apr. 8, 1919.
4 SHEETS—SHEET 3.
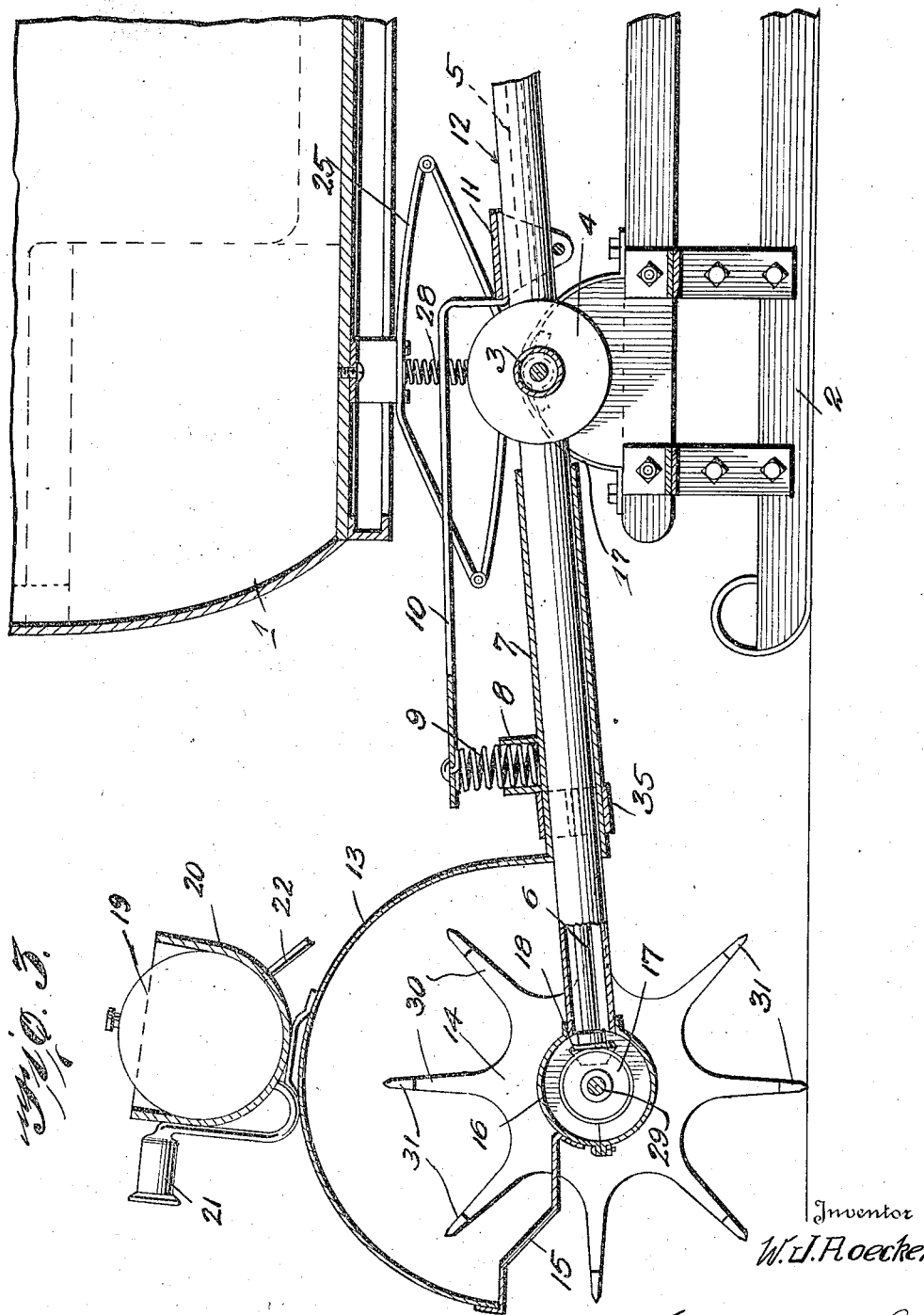

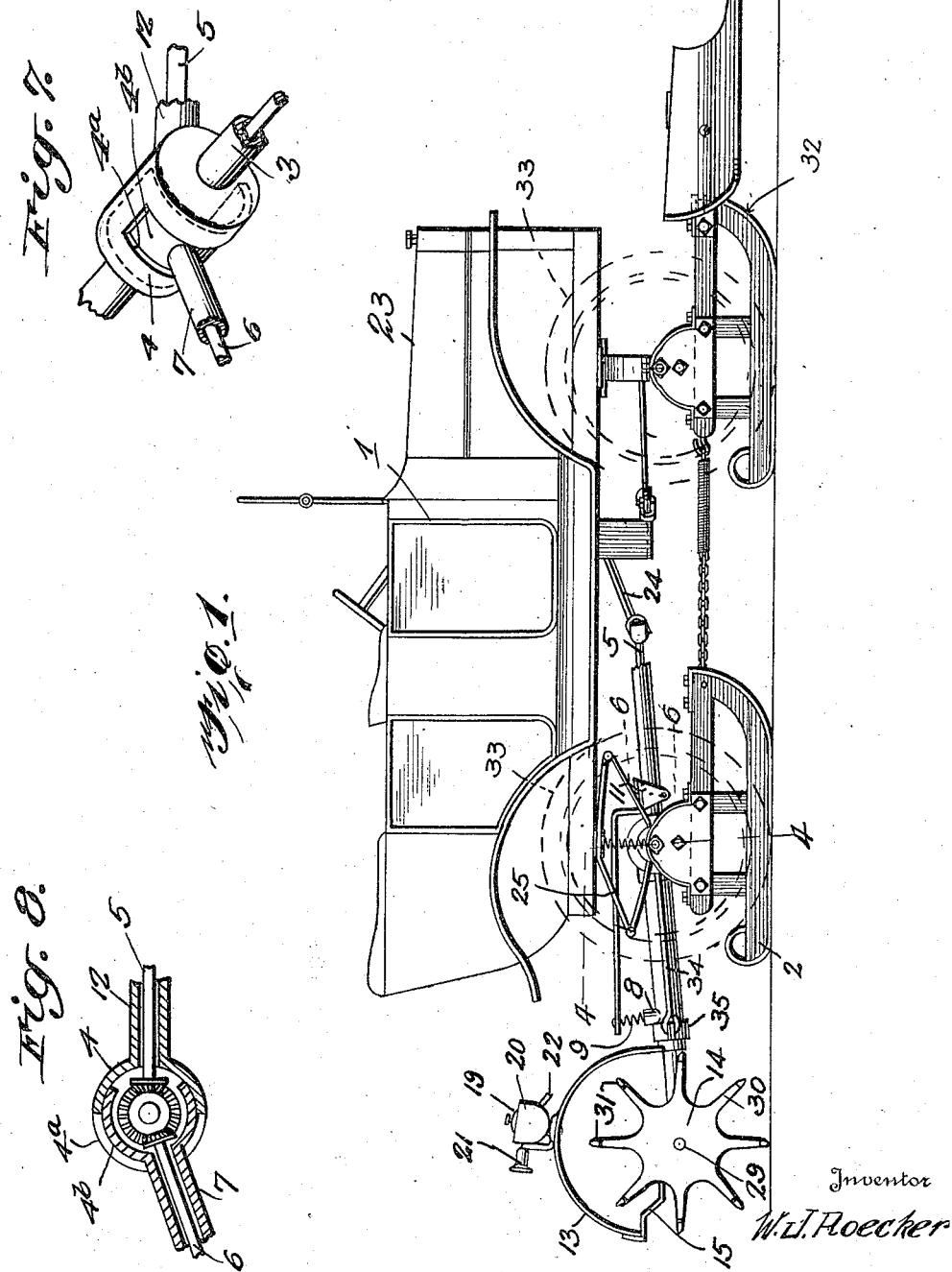

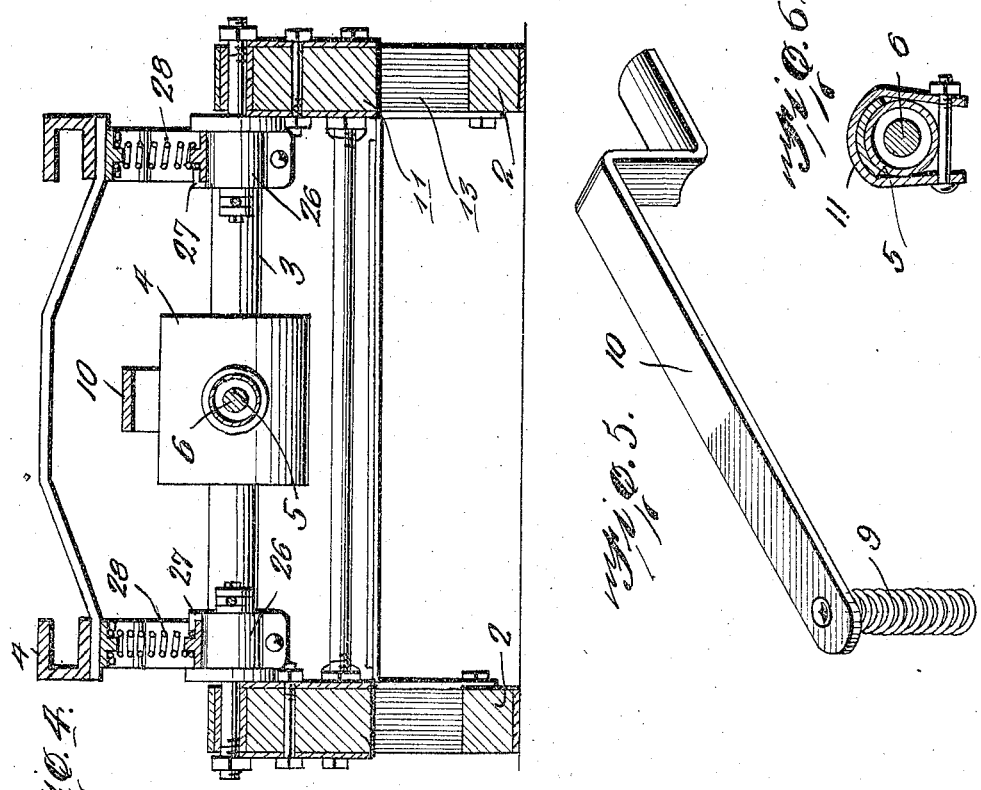

UNITED STATES PATENT OFFICE.

WILLIAM J. ROECKER, OF WITTENBERG, WISCONSIN.

MOTOR-SLEIGH.

1,299,862.  Specification of Letters Patent.  Patented Apr. 8, 1919.

Application filed August 16, 1917. Serial No. 186,638.

*To all whom it may concern:*

Be it known that I, WILLIAM J. ROECKER, a citizen of the United States of America, residing at Wittenberg, in the county of Shawano and State of Wisconsin, have invented certain new and useful Improvements in Motor-Sleighs, of which the following is a specification, reference being had therein to the accompanying drawing.

This invention relates to an automobile sleigh or motor vehicle driving mechanism and has for its principal object the production of a simple and efficient means for driving the sleigh or automobile over slippery surfaces, or over muddy roads.

Another object of this invention is the production of a simple and efficient driving mechanism adapted to be supported in connection with a motor vehicle, whereby the driving mechanism will efficiently grip the surfaces of the road or ground over which the vehicle is traveling.

With these and other objects in view this invention consists of certain novel combinations, constructions, and arrangements of parts as will be hereinafter fully described and claimed.

In the accompanying drawings:—

Figure 1 is a side elevation of a motor sleigh, having the driving mechanism secured thereto, the supporting wheels being shown in dotted lines, which supporting wheels may of course be substituted for the sleigh runners illustrated in Fig. 1 in full lines.

Fig. 2 is a bottom plan view of the automobile sleigh, the runners being supported or secured thereto.

Fig. 3 is a central longitudinal section through the driving mechanism for the vehicle.

Fig. 4 is a section taken on the line 4—4 of Fig. 1, the transmission housing being shown in rear elevation.

Fig. 5 is a detail perspective of the spring resistance rod for the rear end of the driving spur wheel frame.

Fig. 6 is a section taken on the line 6—6 of Fig. 1.

Fig. 7 is a fragmentary, perspective view of the rear axle and its coöperating parts, while Fig. 8 is a longitudinal, sectional view through the middle of Fig. 7.

A rear sled-truck 2 is secured to the rear axle 3. This rear axle 3 is provided with a sectional gear box 4 for transferring power from the power shaft 5 to the driving shaft 6. This driving shaft 6 works through a vertically-swinging casing 7, which casing is secured in box 4, and this casing 7 carries a socket 8 within which a coil spring 9 is carried by the rear end of the rearwardly extending hanger arm 10 which is securely fastened under the clamp 11 carried by the stationary casing 12 within which the power shaft 5 works. The arm 10 being fixed upon the stationary casing 12, produces a downwardly yielding pressure through spring 9, upon casing 7, supporting spur wheels 14, thereby holding said wheels 14 at all times in operable engagement with the surface over which the machine is passing. The vertically-swinging casing 7 is provided with an overhanging shield 13, which overhanging shield is adapted to constitute a protector cover for the spur driving wheels 14 to be hereinafter described. This shield 13 is braced at its rear end by means of a bracing bracket 15 and the bracing bracket 15 is in turn secured to the transverse casing 16 which carries the spur driving wheel gear 17. This gear 17 is in turn driven by means of a beveled gear 18 from the driving shaft 6 above described.

A fuel tank 19 is mounted within a hopper 20 supported upon the shield 13 and this hopper 20 supports a tail light 21 which may be of any suitable or desired construction. A suitable feeding tube 22 passes from this tank 19 to the engine, which engine may of course be placed in the usual position, within the hood 23 of the body 1. The power shaft 5 is driven in any suitable or desired manner through the medium of the driving shaft 24.

The rear supporting springs 25 are secured to the bottom of the body 1 of the automobile, and these springs are secured to the rear axle by means of the clamps 26 which clamps 26 fit snugly around the rear axle and are provided with overhanging lips 27 for fitting snugly around the springs 25 and holding these springs 25 against lateral movement, as shown clearly in Fig. 4 of the drawings. Additional springs 28 are interposed between the springs 25 to assist in yieldably supporting the rear end of the body 1.

The transverse casing 16 carries an axle 29 and this axle 29 supports a pair of spaced spur wheels 14 above described, which spur wheels are provided with a plurality of projecting fingers 30 having chiseled ends 31 for firmly biting into the road or ground over which the automobile or sleigh is passing. The axle 29 is driven as above stated through the medium of the beveled gears 17 and 18.

It of course should be understood that the forward sled-truck 32 and the rear sled-truck 2 may be removed from the axles of the automobile and that the wheels shown in dotted lines in Fig. 1 and indicated by the numeral 33 may be substituted for the truck, for the purpose of permitting the sleigh to be readily converted into a wheeled vehicle. It is obvious that the present device is very effective upon soft roads for driving the vehicle, as well as upon hard or snowy surfaces.

The casing 7 is braced against lateral swinging movement by means of the laterally extending braces 34, which are secured to the collar 35 at their rear ends, and are secured to the ears 36 of the rear axle 3 at their forward ends.

The vertically-swinging hollow extension or casing 7 is integral with the inner section 4ᵇ of the box or casing 4; a vertical movement of shaft 6 and casing or section 7 is permitted by reason of the slot 4ᵃ formed in box 4. I make no claim to this specific structure (Figs. 7 and 8) but by reason thereof a very efficient vertically-movable spur gear carrying means for driving this sleigh is produced.

What is claimed is:—

1. A motor vehicle of the class described, comprising a driving shaft, a power shaft, spur wheels carried by said driving shaft, said spur wheels being held in spaced relation, means for driving said spur wheels from said driving shaft, a shield overhanging said spur wheels, a sleeve surrounding said power shaft, a sleeve surrounding said driving shaft, a gear interposed between said power and driving shafts, and means carried by said power shaft and engaging said driving shaft for yieldably holding said driving shaft in an operative position.

2. In a mechanism of the class described, the combination with a rear axle, a casing supported upon said rear axle, of a casing extending from said first-mentioned casing and provided with a spring-receiving socket, a hanger arm positioned above said casing, means supporting said arm at one end upon said axle, a spring in said socket and engaging said hanger arm, a driving shaft within said last-mentioned casing, a spur wheel, and means operably connecting said spur wheel to said driving shaft.

3. In a mechanism of the class described, the combination with a rear axle, a casing supported upon said rear axle, of a casing carried by said first-mentioned casing, said last-mentioned casing provided with an integral shield and with a transverse casing secured thereto under said shield, bracing means connected to the outer portion of said shield and also connected to said transverse casing, a driving shaft mounted in said second-mentioned casing, spur wheels contiguous to the ends of said transverse casing and positioned under said shield, and means connecting said spur wheels and positioned in said transverse casing and connecting said driving shaft whereby when the driving shaft is rotated, rotary movement will be imparted to said spur wheels.

4. In a mechanism of the class described, the combination with a rear axle, a casing supported upon said rear axle, of a casing carried by said first-mentioned casing and projecting forwardly and rearwardly thereof, said last-mentioned casing provided near its rear end with spring-receiving means, a spring in said spring-receiving means, a hanger arm engaging said spring and extending forwardly and being positioned at its forward end upon the forwardly extending portion of the casing, a power shaft and a driving shaft in said second-mentioned casing, a spur wheel, and means operably connecting said spur wheel to said driving shaft.

5. In a mechanism of the class described, the combination with an axle, a casing supported upon said rear axle, of a casing provided with a shield extending rearwardly from said first-mentioned casing, yielding means engaging the top of the second-mentioned casing and being adapted to exert a downward pressure thereon, a spur wheel under said shield, and means connected to the spur wheel and also positioned in said second-mentioned casing for imparting rotary movement to said spur wheel.

6. In a mechanism of the class described, the combination with a rear axle, a casing supported upon said rear axle, of a forwardly extending casing secured to said first-mentioned casing, a rearwardly extending casing secured to said first-mentioned casing, a clamp mounted upon said forwardly extending casing, yieldable means positioned between said clamp and said forwardly extending casing, and coöperating with said rearwardly extending casing for exerting a downward pressure upon said last-mentioned casing, a driving wheel positioned contiguous to said rearwardly-extending casing, and means in said forwardly-extending casing and said rearwardly-extending casing and operably connected to said driving wheel for imparting a rotary movement to said driving wheel.

In testimony whereof I hereunto affix my signature.

WILLIAM J. ROECKER.

Copies of this patent may be obtained for five cents each, by addressing the "Commissioner of Patents, Washington, D. C."